US012808798B2

(12) United States Patent
Ross et al.

(10) Patent No.: US 12,808,798 B2
(45) Date of Patent: Nov. 24, 2026

(54) METHOD FOR DETECTING AN ANALYTE

(71) Applicant: PSYROS DIAGNOSTICS LIMITED, Sandwich (GB)

(72) Inventors: Steven Andrew Ross, Aldington (GB); Paul Brendan Monaghan, Eastchurch (GB); Julie Richards, Faversham (GB); Aileen Jane McGettrick, Herne Bay (GB)

(73) Assignee: PSYROS DIAGNOSTICS LIMITED, Sandwich (GB)

( * ) Notice: Subject to any disclaimer, the term of this patent is extended or adjusted under 35 U.S.C. 154(b) by 678 days.

(21) Appl. No.: 18/267,726

(22) PCT Filed: Dec. 15, 2021

(86) PCT No.: PCT/GB2021/053301
§ 371 (c)(1),
(2) Date: Jun. 15, 2023

(87) PCT Pub. No.: WO2022/129899
PCT Pub. Date: Jun. 23, 2022

(65) Prior Publication Data

US 2024/0060891 A1 Feb. 22, 2024

(30) Foreign Application Priority Data

Dec. 16, 2020 (GB) ..................................... 2019912

(51) Int. Cl.
*G01N 21/64* (2006.01)
*G01N 1/44* (2006.01)

(52) U.S. Cl.
CPC .......... *G01N 21/6428* (2013.01); *G01N 1/44* (2013.01); *G01N 21/6458* (2013.01)

(58) Field of Classification Search
CPC .. G01N 21/6428; G01N 1/44; G01N 21/6458; G01N 2021/6439; G01N 2333/59; G01N 33/542; G01N 33/54373
See application file for complete search history.

(56) References Cited

U.S. PATENT DOCUMENTS

2004/0229380 A1* 11/2004 Chan-Hui ............ G01N 33/542 436/518
2007/0082346 A1 4/2007 Schelp et al.
(Continued)

FOREIGN PATENT DOCUMENTS

CN 107741417 A * 2/2018 ............. G01N 21/65
JP H07-159325 A 6/1995
(Continued)

OTHER PUBLICATIONS

Song et al., Translated copy of patent CN 107741417 A "An In-situ Method For Fast Detecting Cell Biological Process", Feb. 27, 2018 (Year: 2018).*
(Continued)

*Primary Examiner* — Jennifer Wecker
*Assistant Examiner* — Tracy Ching-Tian Colena
(74) *Attorney, Agent, or Firm* — Wood, Phillips, Katz, Clark & Mortimer

(57) ABSTRACT

A method for detecting an analyte in a sample is provided. A mixture comprising a sample, a reporter reagent, and a pre-activator reagent is applied to a device including a substrate having an optical component and a binding component attached to a surface. The reporter reagent binds to the surface in proportion to analyte concentration. Upon irradiation, the reporter reagent generates reactive oxygen species from the pre-activator reagent, causing localized changes in the optical component from a first optical state to a second optical state. Prior to irradiation, the substrate is contacted with a deuterium-enriched fluid and/or includes a
(Continued)

deuterium-enriched surface layer to enhance signal formation. Detection of localized regions having the second optical state enables measurement of analyte presence. The method facilitates sensitive detection, including in complex samples, without requiring removal of unbound components.

24 Claims, 6 Drawing Sheets

(56) References Cited

U.S. PATENT DOCUMENTS

| | | | | |
|---|---|---|---|---|
| 2007/0254349 | A1 | 11/2007 | Vizethum et al. | |
| 2010/0290954 | A1 | 11/2010 | Minami et al. | |
| 2014/0039156 | A1 | 2/2014 | Lasmezas et al. | |
| 2019/0195858 | A1* | 6/2019 | Marcus | C12Q 1/6886 |

FOREIGN PATENT DOCUMENTS

| | | | |
|---|---|---|---|
| JP | 2007-512543 | A | 5/2007 |
| JP | 2007-532606 | A | 11/2007 |
| JP | 2009-145326 | A | 7/2009 |
| JP | 2019-164171 | A | 9/2019 |
| WO | 2004/011672 | A1 | 2/2004 |
| WO | 2017/091609 | A1 | 6/2017 |

OTHER PUBLICATIONS

International Search Report and Written Opinion for corresponding PCT application No. PCT/GB2021/053301 mailed Mar. 7, 2022.

Barik Atanu et al., "Singlet Oxygen: Photosensitized generation, detection and reaction with organic molecules", Oct. 1, 2006, p. 1-28, XP55894183.

Cretich et al., Digital detection of biomarkers assited by nanoparticles: application to diagnostics.

Office Action for Japanese Patent Application No. 2023-536540 mailed Nov. 11, 2025.

Eglen et al., "The Use of AlphaScreen Technology in HTS: Current Status", Current Chemical Genomics, 2008, vol. 1, 2-10.

* cited by examiner

METHOD FOR DETECTING AN ANALYTE

FIELD OF THE INVENTION

The present invention relates to a method for detecting an analyte, and particularly to a method for detecting individual binding events due to the presence of an analyte in a sample.

BACKGROUND OF THE INVENTION

There are many techniques available for the measurement of biologically relevant parameters in human samples, such as blood, plasma, serum, tissue etc. A common method is to use a capture reagent that binds to the target of interest, and a reporter reagent that has a label of some sort. The capture reagent can be bound to a solid phase, such as a microtitre plate, a bead or a membrane. When the sample is incubated with the capture reagent, the analyte binds to the capture reagent. The reporter reagent also binds to the analyte. Excess reporter can then be removed (by washing) and the quantity of reporter reagent can be measured, thus giving a measure of the amount of analyte present in the sample. There are many different variations on how these types of binding assay can be carried out. For example, the analyte can bind to the capture reagent first, then the reporter can be added in a separate step, or the analyte can bind to the reporter first, and then bind to the capture reagent.

There are a wide range of reagents that can be used as capture and reporter in binding assays of this type, including nucleic acids, carbohydrates, antigens, peptides, proteins and antibodies. There are also a wide range of target analytes, including peptides, proteins, antibodies, nucleic acids, cells, carbohydrates, small molecules, therapeutic drugs, drugs of abuse, steroids, hormones, lipids etc.

Assays that use antibodies are commonly termed immunoassays. Immunoassays can take a number of formats. For example, when a capture antibody is used to capture the analyte and a reporter antibody is used to generate a measurable signal, this is commonly called a sandwich immunoassay. Alternative formats are known, where the binding agent is attached to a solid phase and target analyte competes in solution with a labelled reagent that also binds to the binding agent. In the absence of analyte, a high signal is obtained, since high levels of the labelled reagent bind. In the presence of analyte, a fraction of the binding sites are blocked, thus less of the labelled reagent binds and the signal is reduced. These assays are commonly known as inhibition or competition assays. Several types of competition assay are known. For example, an antibody could be bound to the solid phase and labelled analyte (or analogue of the analyte) can compete for the binding sites on the antibody. Alternatively, an analogue of the analyte could be immobilised, and a labelled antibody could bind to this surface. In the presence of analyte in the sample, this will bind to the antibody in solution, preventing binding to the surface, and signal will be diminished.

There are many formats for assays, and many different types of label that can be employed. For example, assays can be heterogeneous, in that excess label is removed before the measurement takes place, for example by the use of wash steps. Removal of excess label can also be achieved by flowing sample and reporter past a capture area. This approach is used in immunochromatographic or lateral flow strips, which are used in rapid testing for infectious disease tests and pregnancy tests, for example. Alternatively, homogeneous assays are known, where the excess reporter is not removed. Homogeneous assays tend to rely on the close proximity of capture and reporter creating some form of signal. One example of a homogeneous assay is an agglutination assay, where particles bind together in solution. The agglutinated particles cause scattering of light, which can be measured by turbidimetry or nephelometry. A further example of a homogeneous assay using particles is the luminescent oxygen channeling immunoassay (LOCI), described in further detail below.

Another example of a homogeneous assay is the fluorescence resonance energy transfer (FRET), where the capture and reporter reagents are donor and acceptor fluorophores respectively, and excitation of the donor leads to energy transfer to the acceptor, followed by light emission.

One homogeneous assay format that functions in whole blood, without removal of cellular material is the pyro-optical immunoassay. Capture antibody is coated on to pyroelectric polyvinylidene PVDF sensor and carbon particles are used as the reporter. Signal is generated by illuminating the sample with light, causing localised heating of the particles. Those bound to the sensor transfer energy to the pyroelectric sensor, causing a thermal stress that is detected as an electrical signal. The more carbon bound, the greater the signal.

The label that is attached to the reporter binding agent can be an agent that absorbs light, such as a dye, gold particle or dyed latex microsphere. Larger particles can, in principle, absorb more light, and generate more signal. However, there is a size limit where particulate labels become impractical to use in assays, as described in more detail below. Luminescent labels are also known, such as fluorescent, chemiluminescent, bioluminescent and electrochemiluminescent labels. Luminescent labels have also been encapsulated in particles for certain types of assay. Amplification of the signal may also be performed by using enzymatic or catalytic reactions. Enzymes can be used to convert a substrate from a leuco dye to a coloured form, or into a fluorescent or luminescent form. It is common for the excess enzyme to be removed using wash steps before the substrate is added, so that signal is generated only by the enzyme that is bound specifically to the analyte.

Immunoassays that do not use labels are also known, such as assays that use surface plasmon resonance as the signal transduction method. However, label free assays tend to lack the sensitivity of assays that use labels to enhance the signal.

Further information on the field of immunoassays can be found in "The Immunoassay Handbook: 4th Edition: Theory and Applications of Ligand Binding, ELISA and Related Techniques", Ed. D. Wild, Elsevier Science, 2013.

All binding assays, including immunoassays, have limitations in terms of the minimum and maximum concentrations of analyte that can be reliably measured.

The signal maximum is generally limited by factors such as the total amount of capture antibody available to bind the analyte and the total amount of reporter antibody to generate signal. If the capture antibody is immobilised on a solid-phase, then the surface area of the solid-phase can limit the upper limit of detection. Additionally, some signal transduction techniques can be prone to saturation, such as colorimetric methods, depending on the pathlength that the light needs to take through the sample. Luminescent methods are less prone to saturation, as the gain on the detector can be attenuated to deal with higher levels of light emission. When all of the antibody binding sites in a heterogeneous assay are filled with analyte, then the maximum signal is reached and the system has saturated. The excess analyte will normally be removed in a wash step before the reporter is added. Homogeneous assays can also suffer from an effect known as high-dose hook, where the concentration of analyte is greater than the effective concentration of capture and/or reporter antibody. In this instance, at very high concentrations, all of the binding sites on the capture and the reporter can be blocked and the assay signal can be diminished, giving erroneous results.

The lower level of detection is governed by a number of different factors. Generally, all assays will be affected by attributes such as the quality of the antibodies being used (affinity and specificity) and cross-reactivity of the antibodies with related analytes. The lower limit of detection is also dependent upon the assay set-up and factors which affect the signal-to-noise ratio of the system design. For example, in a standard enzyme-linked immunosorbent assay (ELISA), capture antibody is coated onto the surface of a 96-well microtitre plate, and then sample is incubated in the wells, leading to the analyte being captured. The wells are washed, and then reporter is added in excess, binding to the captured analyte. Excess reporter is then washed away and substrate is added that can react with the enzyme, being converted into an active form. For example, a non-coloured leuco dye, such as 2,2'-azino-bis (3-ethylbenzothiazoline-6-sulphonic acid) (ABTS) can be converted by horseradish peroxidase into an oxidised green form in the presence of hydrogen peroxide. When the analyte is present in very low quantities (e.g. less than 1 picomolar), there will only be very small quantities of enzyme bound to the surface of the well. The ABTS reacts with the enzyme to generate the green form, then diffuses into the bulk of the fluid, generating a solution that is so dilute that it cannot be distinguished from background signal. Auto-conversion of substrate can also generate colour that interferes with the measurement. Similarly, other detection methods, such as fluorescence can suffer from interfering factors and auto-fluorescence of components in the sample or the reaction wells.

Another confounding factor in immunoassays can be non-specific binding of reporter reagents to the capture surface. For example, in the ELISA assay described above, the microtitre well is coated in a layer of protein, some of which can become de-natured during the coating process. It is not uncommon for reporter to bind to areas of the capture surface during the assay. If this reporter turns over substrate to contribute to the overall signal, it is not possible to distinguish the signal due to specifically bound reporter from that which is bound non-specifically. Non-specific binding can also be promoted by many of the components present in the original sample, which can bind to the capture surface during the initial incubation, modifying the surface properties of the capture layer, creating a surface that can bind the reporter. Minimising non-specific binding of reporter involves careful optimisation of all reagents and reaction conditions used during the assay, including antibodies, detergents, temperature and ionic strength.

Generally, the limit of detection of traditional immunoassays is around 0.1 picomolar to 1 nanomolar, depending upon the assay methodology. Developing assays with very low detection limits using traditional approaches often requires a great deal of optimisation, with stringent wash steps to reduce non-specific binding and maximise signal-to-noise. Additionally, the capture surface is often small in relation to the sample volume to ensure that the signal is high enough relative to the background.

One approach that has been used to circumvent issues relating to signal-to-noise and improve detection limits is to measure individual binding events, and to count these binding events as “on” or “off” events, if the measurement is above a localised threshold. In this way, much of the background noise can be eliminated. Analogies can be drawn with digitisation of audio or communication signals. These digital assays have been shown to reach detection limits that were previously unattainable using traditional analogue methods. For example, detection limits in the low femtomolar ($10^{-15}$ mol/L) and even attomolar ($10^{-18}$ mol/L) range have been reported. See for example “Evaluation of highly sensitive immunoassay technologies for quantitative measurements of sub-pg/mL levels of cytokines in human serum”, Yeung et al., Journal of Immunological Methods, 2016, 437, 53 and “Digital Detection of Biomarkers Assisted by Nanoparticles: Application to Diagnostics”, Cretich et al., Trends in Biotechnology, 2015, 33, 343.

The majority of labels/reporters used in assays (such as fluorophores, dyes etc.) are not visible individually using wide-field microscopy, even under high magnification, as their size is below the diffraction limit of visible light. Thus, the presence of these labels can only be measured as a bulk phenomenon, not by counting each label. In contrast, particulate labels, such as latex particles, can in theory be visualised by wide-field optical microscopy if they are above a certain size. Depending upon the optical set-up, it is possible to start visualising particles when they have a diameter of several hundred nanometres and above, depending on the numerical aperture and type of microscope.

However, using particles of this size as labels to monitor individual binding events on a capture surface (such as an antibody-antigen interaction) becomes impractical for a number of reasons. For example, particles of this size diffuse very slowly in comparison to other types of label, impairing the rate of the reaction at a planar surface. They also start to exhibit macroscopic buoyancy effects and will sediment or float if the density of the particle is significantly different to the medium that they are contained in, which can also cause issues with assay format. Particles of this size are particularly prone to binding non-specifically to surfaces, causing high background, which is difficult to remove. Finally, excess particles must be removed, requiring wash steps. However, large particles start to suffer from shear effects in the presence of fluid flow, where the shear force on the particle becomes greater than the rupture strength of the antibody-antigen interaction (approximately 60-250 pN), leading to particles being washed away (see “Rapid Femtomolar Bioassays in Complex Matrices Combining Microfluidics and Magnetoelectronics”, Mulvaney et al., Biosensors and Bioelectronics, 2007, 23, 191).

Examples of digital assays include the Quanterix Single Molecule Array (SIMOA) system and the Merck Millipore Single Molecule Counting (SMC) system.

The Quanterix SIMOA system uses antibody-coated paramagnetic beads to capture analyte from solution. The magnetic beads are then washed, and reporter antibody labelled with enzyme is added. The quantity of beads is sufficient that the probability of having more than one analyte and reporter per bead is minimised. The beads are washed again, then loaded into an array of microwells that can only hold one bead per well. The volume of the microwells is on the femtolitre scale. If the bead has enzyme attached, then fluorogenic substrate in the well is turned over. The small dimensions of the well prevent the fluorescent product from becoming too diffuse. Each well is then counted as an “on” or “off” event if the fluorescence is above a threshold value.

The SMC system is used in the Erenna and SMCxPRO systems from Merck Millipore. The fundamental measurement technique in both systems is the same. Magnetic beads, coated in capture antibody, are used to capture the target analyte in a sandwich assay. Fluorescently labelled reporter antibody also binds to the bead, in the presence of analyte. The beads are pulled down with a magnet and excess fluorescently-tagged reporter is washed away. An eluting buffer is then added that causes dissociation of the sandwich complex, which is then transferred to a measurement vessel. The presence of the fluorescent tag is then measured using a confocal fluorescent microscope that sequentially interrogates small volumes of the sample to determine if the fluorescent tag is present or not. If the signal for each individual measurement is above a threshold value, this counts as an "on" event for that measurement.

Several independent academic reviews of high-sensitivity immunoassays have highlighted that the digital approach to immunoassays allows unprecedented improvements to detection limits (see references Yeung and Cretich above).

The detection limit of the Quanterix and Merck Millipore systems is dependent upon the volume of sample that is used in the assay. Fora 10 microlitre serum or plasma sample, the theoretical limit would be the detection of a single binding event, corresponding to 1 molecule. However, in terms of molarity, this would correspond to 100,000 molecules per litre of sample, or $0.16 \times 10^{-18}$ moles per litre (0.16 attomolar).

However, the Quanterix and Merck Millipore systems described above are complex and cumbersome, each requiring a number of wash and transfer steps. Further, the assays can only be carried out for samples that do not contain cellular material and the systems require expensive instrumentation in order to achieve the performance that they offer. There therefore remains a need for simpler and more cost-effective high-sensitivity systems.

BRIEF SUMMARY OF THE INVENTION

Accordingly, the present invention provides a method for detecting an analyte in a sample, the method comprising the steps of:

(i) providing a mixture comprising a sample, a reporter reagent, and a pre-activator reagent to a device, the device comprising a substrate having an optical component and a binding component, where the optical component and the binding component are attached to a surface of the substrate, the reporter reagent being capable of generating reactive oxygen species from the pre-activator reagent upon absorption of electromagnetic radiation, and the optical component being capable of changing from a first optical state to a second optical state on reaction with the reactive oxygen species;

(ii) allowing a portion of the reporter reagent to bind to the surface of the substrate in proportion to the concentration of the analyte, by means of the binding component;

(iii) irradiating the device with electromagnetic radiation for absorption by the reporter reagent, thereby forming a set of local regions of the optical component having the second optical state on the substrate, wherein, prior to irradiating, the substrate is contacted with a deuterium-enriched fluid, and/or the substrate has a deuterium-enriched layer on the surface thereof; and (iv) detecting the set of local regions having the second optical state on the substrate.

Thus, the present invention provides a method for detecting an analyte in a sample in which only the reporter reagent in the vicinity of the surface of the substrate results in a signal, the signal being a local region of the optical component in the second optical state. It is the set of local regions of the optical component in the second optical state that are detected. The signals are generated by the reaction of reactive oxygen species with the optical component, and a deuterium-enriched environment provides for larger signals which are easier to image. Therefore, the present invention simplifies digital detection of the analyte and facilitates homogeneous assays on a range of samples, including those containing cellular materials.

BRIEF DESCRIPTION OF THE DRAWINGS

The present invention will now be described with reference to the drawings, in which.

DETAILED DESCRIPTION OF THE INVENTION

The present invention is used for detecting an analyte in a sample (which may be via the detection of a complex or derivative of the analyte).

Figure 1:
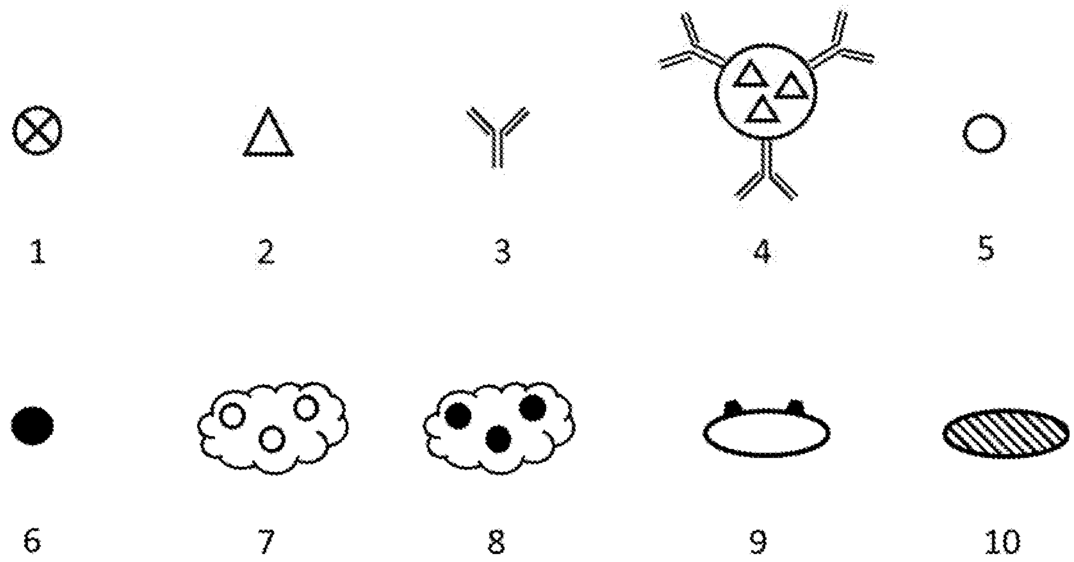
FIG. 1 shows various components that may be used in the present invention.

The components of FIG. 1 are: analyte 1; photosensitiser 2; capture antibody 3; reporter antibody conjugate of latex particle infused with photosensitiser 4; fluorescent dye 5; fluorescent dye after being bleached 6; streptavidin labelled with fluorescent dye 7; streptavidin labelled with fluorescent dye (after bleaching) 8; biotin-labelled BSA 9 and red blood cell 10.

Step (i) of the method of the present invention involves providing a mixture comprising a sample, a reporter reagent and a pre-activator reagent to a device, the device comprising a substrate 12 having an optical component and a binding component, where the optical component and the binding component are attached to a surface of the substrate 12. The sample, the reporter and the pre-activator reagent may be pre-mixed before adding the mixture to the device; or the sample, the reporter reagent and the pre-activator reagent may be added sequentially to the device to form the mixture. The mixture may also contain additional reagents but preferably, the mixture consists of the sample, the reporter reagent, and the pre-activator reagent.

Figure 2:
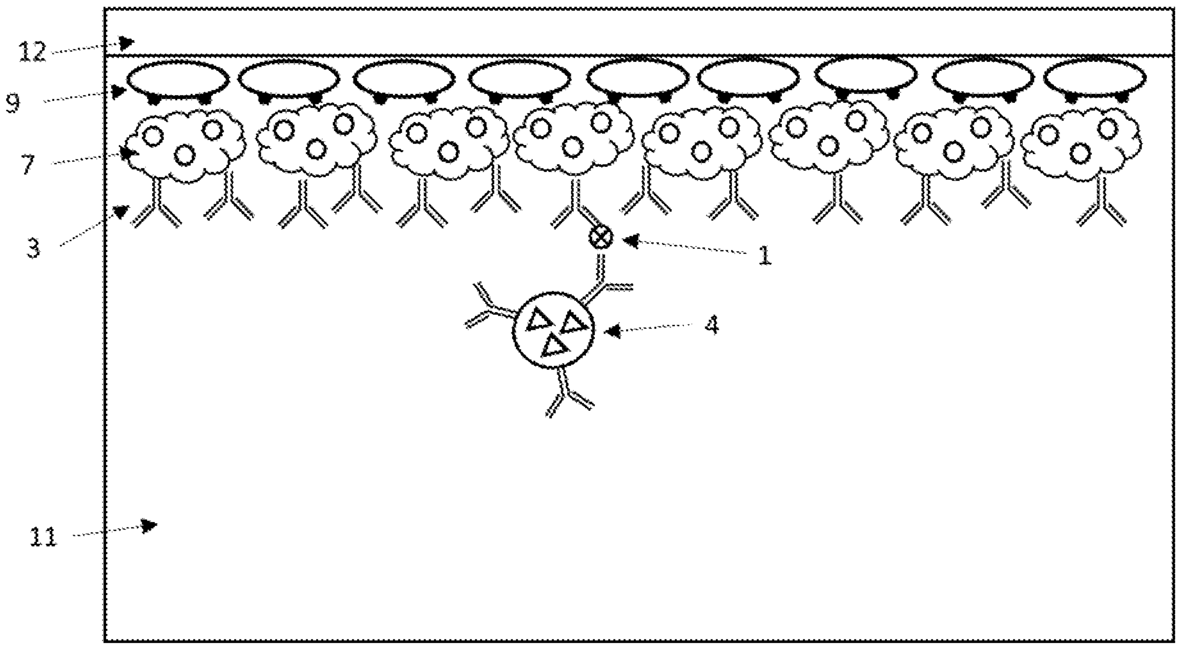
FIG. 2 shows a device in which a reporter reagent is bound to the surface of the substrate through formation of a sandwich with an analyte.

By way of an explanation of the principle underlying the present invention, FIG. 2 shows a device in which a reporter reagent is bound to the surface of the substrate via analyte, 1 before irradiation. The device includes a substrate 12 and a sample chamber 24 for holding a sample containing an analyte dissolved or suspended therein. The substrate may be any substrate that allows detection of the set of local regions having the second optical state on the substrate.

Preferably, the substrate is a transparent substrate and more preferably, the substrate is glass. The substrate 12 is usually planar.

The substrate 12 has capture antibody 3 attached to a surface of the substrate 12 via streptavidin labelled with fluorescent dye 7 and biotin-labelled BSA 9. The fluorescent dye acts as the optical component and the capture antibody 3 acts as the binding component. Biotin-labelled BSA and streptavidin are inert macromolecules that facilitate attachment of the optical and binding components to the surface of the substrate 12. This approach is used when the optical component is water soluble, since the optical component needs to be tethered to the surface of the substrate 12 in order for it to be immobilised.

Although the optical and binding components are shown in this way, any technique for holding the optical and binding components proximal to the surface of the substrate 12 is applicable. For example, the optical and binding components may be separate reagents and the binding component attached to the optical component.

The optical component may also be encapsulated within a polymer layer which is coated onto the surface of the substrate 12 and the binding component attached to the polymer layer. The polymer may be silicone, polystyrene or polyisobutylene, or any other suitable polymeric plastic that can be used to encapsulate the optical component. This approach can be used when the optical component is water insoluble.

Alternatively, a gel, e.g. a hydrogel, layer may be impregnated with the optical component and the gel/hydrogel layer coated onto the surface of the substrate 12 and the binding component attached to the gel/hydrogel layer.

Step (ii) of the method of the present invention involves allowing a proportion of the reporter reagent to bind to the surface of the substrate in proportion to the concentration of the analyte, by means of the binding component. This may be achieved by allowing the device to stand for a period of time, for example 10 minutes.

In FIG. 2, capture antibody 3 is attached to a surface of the substrate 12 via streptavidin labelled with fluorescent dye 7 and biotin-labelled BSA 9. Antibody conjugate of latex particle infused with photosensitiser 4 acts as the reporter reagent.

The reporter reagent is shown bound to the surface of the substrate 12 via analyte 1. In this way, when analyte is present, the reporter reagent binds to the surface of the substrate in proportion to the concentration of the analyte in the form of a so-called "sandwich" complex as discussed below with reference to FIG. 6.

All steps up until this point have taken place in the absence of light. Step (iii) of the method of the present invention involves irradiating the device with electromagnetic radiation for absorption by the reporter reagent, thereby forming a set of local regions of the optical component having the second optical state on the substrate 12. Step (iii) of the method of the present invention further involves providing a deuterium-enriched environment, wherein, prior to irradiating, the substrate is contacted with a deuterium-enriched fluid, and/or the substrate has a deuterium-enriched layer on the surface thereof.

Thus, the present invention provides a method whereby the device is irradiated with electromagnetic radiation, and this radiation is absorbed by a photosensitiser of the reporter reagent. The reporter reagent then generates reactive oxygen species from the pre-activator reagent, which reacts with the optical component, which changes from the first optical state to the second optical state, thereby forming a set of local regions of the optical component having the second optical state on the substrate 12.

Figure 3:
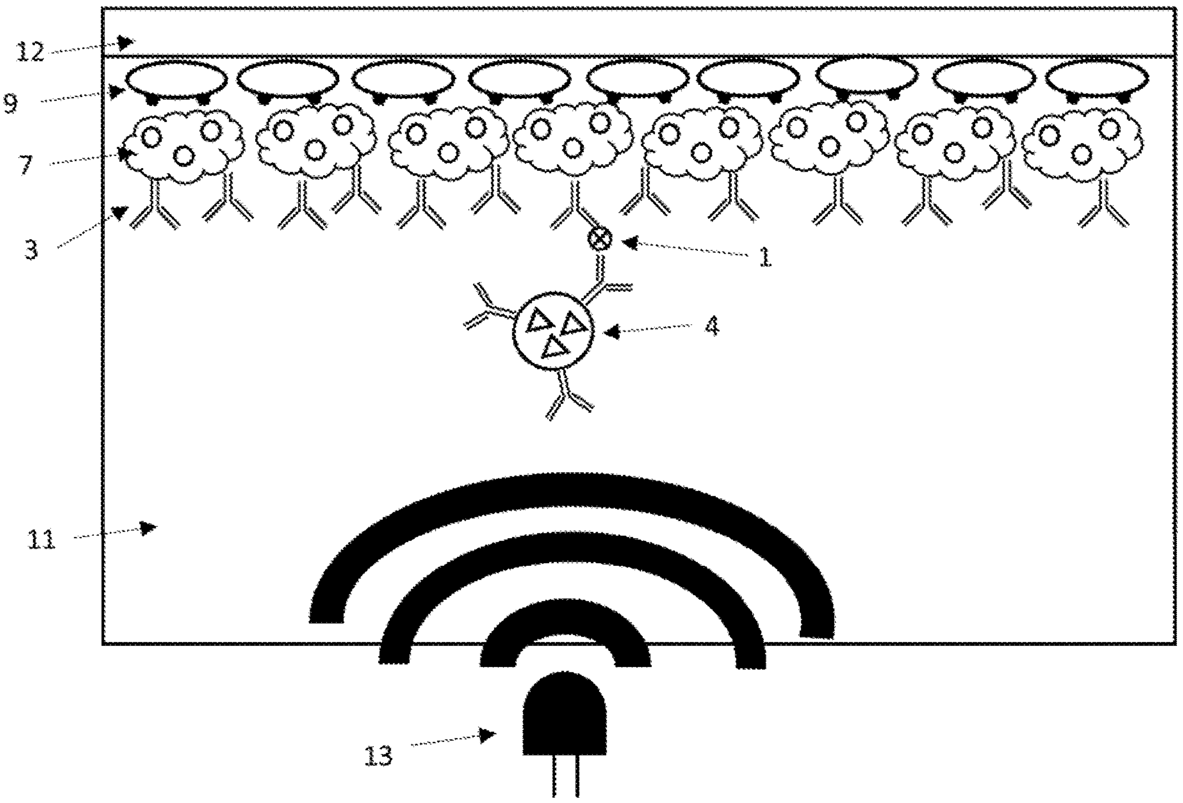
FIG. 3 shows the device being irradiated.

FIG. 3 shows the device of FIG. 2 being irradiated with electromagnetic radiation (typically termed "light"), preferably visible light, by illumination source 13. The light source illuminates the sample chamber 24 with light of the appropriate wavelength to excite the photosensitiser infused in latex particle 4. The wavelength depends on the photosensitiser but a preferred wavelength is 680 nm. The device is typically irradiated for at least 30 seconds. Preferably, the device is irradiated with electromagnetic radiation for more than 1 second, more preferably at least 2 seconds, more preferably at least 5 seconds, more preferably at least 10 seconds, more preferably at least 15 seconds, more preferably at least 20 seconds, more preferably at least 25 seconds and most preferably at least 30 seconds. This ensures that there is an irreversible optical change on the surface of the substrate, thus allowing long-lived and transient binding events to be distinguished.

Figure 4:
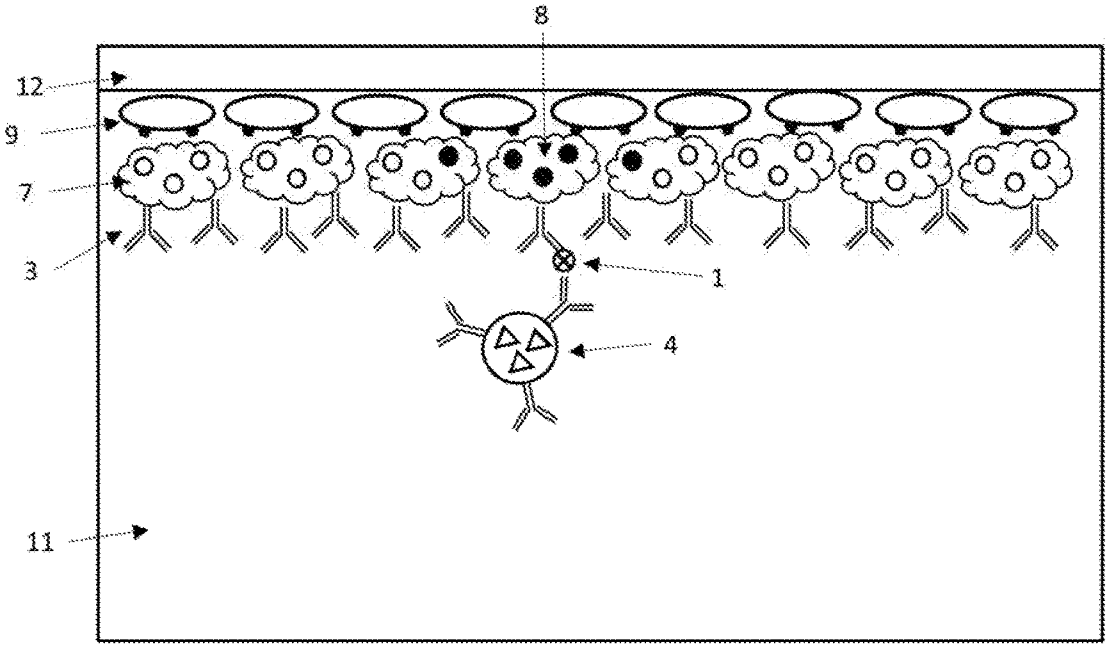
FIG. 4 shows the device after irradiation has taken place in a non-deuterium-enriched environment.

FIG. 4 shows the device of FIG. 3 after irradiation, wherein the substrate is not contacted with a deuterium-enriched fluid prior to irradiating. The reactive oxygen species generated by the photosensitiser of the latex particle infused with photosensitiser 4 reacts with the dye optical component of the streptavidin labelled with fluorescent dye 7 to cause the dye to change from a fluorescent state to a non-fluorescent state. Streptavidin labelled with fluorescent dye in fluorescent state 7 becomes streptavidin labelled with fluorescent dye in non-fluorescent state 8. Only the dye that is in close proximity to the reporter reagent changes from the first optical state to the second optical state.

Figure 5:
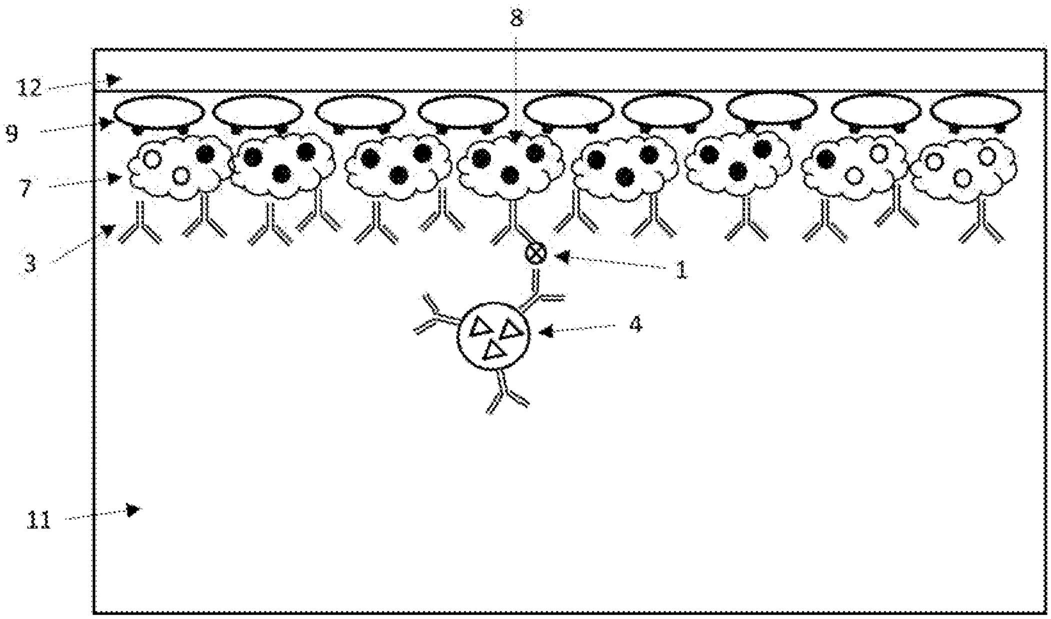
FIG. 5 shows the device after irradiation has taken place in a deuterium-enriched environment.

FIG. 5 shows the device of FIG. 3 after irradiation, wherein the substrate is contacted with a deuterium-enriched fluid prior to irradiating. The reactive oxygen species generated by the photosensitiser of the latex particle infused with photosensitiser 3 reacts with the dye optical component of the streptavidin labelled with fluorescent dye 7 to cause the dye to change from a fluorescent state to a non-fluorescent state. Streptavidin labelled with fluorescent dye in fluorescent state 7 becomes streptavidin labelled with fluorescent dye in non-fluorescent state 8. Compared with FIG. 4, dye at a much greater distance from the reporter reagent changes from the first optical state to the second optical state.

Although the dye is shown changing from a fluorescent state to a non-fluorescent state, other optical components undergo alternative changes. In one embodiment, the dye changes from a non-fluorescent state to a fluorescent state. In another embodiment, the optical component in the first optical state absorbs light at one or more first wavelengths and in the second optical state absorbs light at one or more second wavelengths, where the first and second wavelengths are different. The light is preferably visible light. The first and second wavelengths being different. In this embodiment, the optical component undergoes a colour change.

Alternative first and second optical states could include changes to light polarisation, fluorescence lifetime, refractive index, light scattering (including Raman scattering) and other optical effects.

Figure 6:
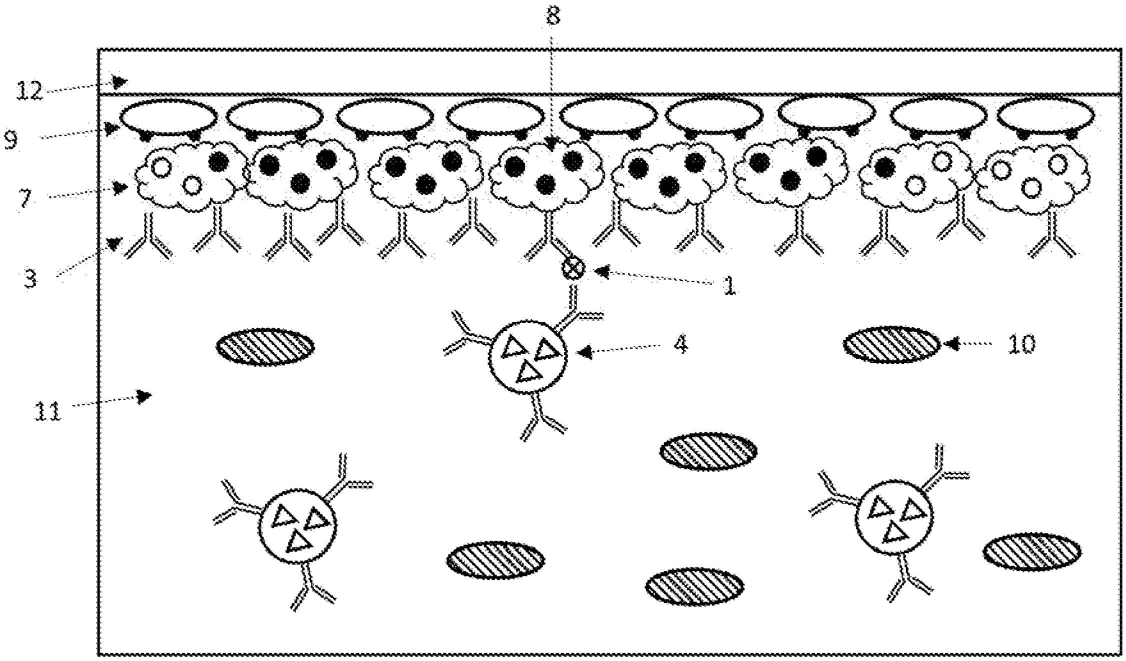
FIG. 6 shows a homogeneous assay format, where excess labelled reporter and cellular components are present in solution for the duration of the assay.

FIG. 6 shows a device in which a whole blood sample and excess reporter reagent are present after irradiation. The whole blood sample also contains additional components such as red blood cells 10. Preferably, the substrate 12 forms the top of the sample chamber 24, allowing red blood cells 10 to sediment away from the substrate 12.

A proportion of the reporter reagent binds to the surface of the substrate 12 by means of a sandwich complex with analyte 1 and capture antibody 3. The sample therefore contains bound reporter reagent and unbound reporter reagent free in solution. The depth of the sample chamber 24 is designed to minimise the diffusion path length of the reporter reagent, and allow equilibrium to be attained rapidly. Typically, the depth of the sample chamber is from 50 to 200 μm.

In a typical sandwich immunoassay using the present invention, the substrate 12 has capture antibody 3 attached to a surface of the substrate 12 via streptavidin labelled with fluorescent dye 7 and biotin-labelled BSA 9. The dye acts as the optical component and the antibody acts as the binding component. Although the optical and binding components are shown in this way, any technique for holding the optical and binding components proximal to the surface of the substrate 12 is applicable, such as those described above.

In the present invention, the sample chamber 24 is filled with a sample containing an analyte 1. A reporter reagent such as antibody conjugate of latex particle infused with photosensitiser 4 is also added to the sample chamber 24. If a whole blood sample is used, the sample may also contain additional components such as red blood cells 10. Whole blood and plasma samples will naturally contain dissolved oxygen, which can act as the pre-activator reagent.

An equilibrium is then attained. Antibody conjugate of latex particle infused with photosensitiser 4 is bound to the surface of the substrate 12 in proportion to the concentration of analyte 1 by means of capture antibody 3. Antibody conjugate of latex particle infused with photosensitiser 4 acts as the reporter reagent. An excess of antibody conjugate of latex particle infused with photosensitiser 4 is included so that all of the analyte 1 forms a sandwich complex. A proportion of the reporter reagent thus binds to the surface of the substrate 12 in proportion to the concentration of the analyte 1, by means of the binding component. The sample therefore contains bound reporter reagent and unbound reporter reagent free in solution.

The reporter reagent must be permanently bound to the surface of the substrate 12 during the entire period of irradiation in order to achieve complete conversion of the first optical state to the second optical state. Any reporter reagent that is not permanently bound to the surface of the substrate 12 during the entire period of irradiation will cause less of the optical component to change from the first optical state to the second optical state, resulting in a smaller signal. Any unbound reporter reagent in solution does not cause the optical component to change from the first optical state to the second optical state.

This provides a significant advantage over other digital assay methods in that it removes the need for washing steps. In this way, the present invention can be carried out as a homogeneous assay. In a conventional assay, the unbound reporter reagent must be separated from the bound reporter reagent before any measurement is taken since the unbound reporter reagent interferes with the signal generated by the bound reporter reagent. However, on account of the localised surface changes provided by the present invention, bound and unbound reporter reagent may be distinguished. Indeed, the ability to distinguish between reporter reagents proximal to the surface of the substrate 12 (i.e. bound) and reporter reagents in the bulk solution (i.e. unbound) is a particular advantage of the present invention. Preferably, steps (i) and (ii) take place in the absence of wash steps, i.e. the method is carried out without removing the sample from the substrate in steps (i) and (ii).

The photosensitiser of the bound reporter reagent portion interacts indirectly with the optical component to cause the change via an additional reagent i.e. the photosensitiser is excited and transfers this energy to an additional component, which then transfers this energy to the optical component.

In a preferred embodiment, the absorption by the photosensitiser is for interaction with a pre-activator reagent present in the mixture thereby to generate reactive oxygen species, and the activator reagent is for reacting with the optical component to change it from the first optical state to the second optical state.

The pre-activator reagent may be present in the sample or the pre-activator reagent may be added to the mixture of the sample and the reporter reagent as an additional reagent. The pre-activator reagent may be ground state oxygen, also known as triplet oxygen. The pre-activator reagent may be any reagent capable of generating a reactive oxygen species on interaction with a photosensitiser after irradiation with electromagnetic radiation. In a preferred embodiment, the pre-activator reagent is triplet oxygen. In another preferred embodiment, the activator reagent is a reactive oxygen species. Preferably, the reactive oxygen species is selected from a hydroxyl radical, superoxide, peroxide, organic peroxides, peroxynitrite, singlet oxygen and mixtures thereof. More preferably, the reactive oxygen species is singlet oxygen.

It is believed that the photosensitiser absorbs the light to generate an excited state which can undergo intersystem crossing (ISC) with oxygen present in the sample and proximal to the reporter reagent to generate singlet oxygen. Singlet oxygen then goes on to react with the optical component as discussed below. In a particularly preferred embodiment, the pre-activator reagent is triplet oxygen and the activator reagent is singlet oxygen.

Singlet oxygen has previously been used in immunoassays in the luminescent oxygen channeling immunoassay (LOCI). The LOCI immunoassay is a homogenous non-digital assay using donor and acceptor beads. The donor beads generate singlet oxygen upon illumination at 680 nm, and the acceptor beads generate a chemiluminescent signal when activated by singlet oxygen. Binding of donor to acceptor beads is promoted by antibody-antigen binding. The reaction mixture is typically illuminated for 0.5 to 1.0 seconds and then the luminescence signal is measured for 0.5 to 1.0 seconds. Critically, the measurement takes place in the presence of all unbound donor and acceptor beads. Spatial separation of the beads minimises background signal; however, the LOCI assay cannot distinguish between long-lived and transient binding events, due to the short measurement time. Unbound beads in close proximity to each other may also generate unwanted background signal. The LOCI assay can achieve a detection limit of around 1-5 pg/mL for its most sensitive assays, for example interleukin 6 (IL-6) or thyroid stimulating hormone (TSH). The present invention minimises background signal even further because the "donor" particles, the reporter reagent, need to be in proximity to the surface of the substrate 12, rather than to particles in solution, in order for a signal to be detected, and must also remain there for the duration of the illumination period. Therefore, the present invention is more sensitive and can detect an analyte in lower concentrations than the LOCI assay.

In one embodiment, the substrate is contacted with a deuterium-enriched fluid prior to irradiating. Any method of providing a deuterium-enriched fluid may be suitable for use in the invention. The deuterium-enriched fluid may be provided by contacting the sample with a deuterium-enriched fluid prior to analysis. For example, the sample may be diluted or washed with a deuterium-enriched fluid prior to irradiation. The deuterium-enriched fluid preferably comprises deuterium oxide, and may be a deuterium-enriched buffer. The use of deuterium oxide is not cost prohibitive.

In another embodiment, the substrate has a deuterium-enriched layer on the surface thereof. Any method of providing a deuterium-enriched layer on the surface of the substrate may be suitable for use in the invention. The layer may be deuterium-enriched by proton exchange with a deuterated fluid, for example, deuterium oxide, or the layer may be synthesised using deuterium-enriched starting materials.

The deuterium-enriched layer may comprise a deuterium-enriched polymer, such as a deuterium-enriched protein or a deuterium-enriched polysaccharide. The deuterium-enriched polymer may be in the form of a deuterium-enriched gel, particularly a hydrogel. Preferably, the deuterium-enriched layer comprises a deuterium-enriched protein layer, or a deuterium-enriched polysaccharide layer.

This layer may be prepared by hydrogen-deuterium exchange of the non-deuterium-enriched starting material. Alternatively, deuterium-enriched polysaccharides or proteins may be prepared by biosynthesis. In another embodiment, the deuterium-enriched layer may comprise a deuterium-enriched gel, wherein the gel is synthesised using deuterium enriched starting materials. In another embodiment, the deuterium-enriched layer may comprise a hydrogel, in which the solid phase and/or the liquid phase may be deuterium enriched. The deuterium-enriched solid phase may be prepared from deuterium enriched starting materials, or the liquid phase may comprise a deuterium-enriched liquid. Preferably, the deuterium-enriched liquid is again deuterium oxide.

In a further embodiment, the substrate is contacted with a deuterium-enriched fluid prior to irradiating, and the substrate has a deuterium-enriched layer on the surface thereof.

Deuterium exchange is a well-known chemical reaction in which a covalently bonded hydrogen atom is replaced by a deuterium atom. It can be applied most easily to exchangeable protons. Exchangeable hydrogen atoms are typically those bound to hydroxyl or amino groups, although thiols can also be targets for deuterium exchange. They are typically introduced using $D_2O$. Non-exchangeable hydrogen atoms in a molecule may also be replaced with deuterium, but this requires deuterated starting materials.

The surface of the substrate is typically deuterium-enriched by using deuterated polymers. Deuterium exchange can also be used, particularly for proteins and polysaccharides, which contain amino and hydroxyl groups. However, these exchangeable deuterium atoms can be lost to the bulk solution when the substrate is contacted with the sample, and hence the use of pre-deuterated starting materials for the components of the substrate is preferred.

When the deuterium enhancement is carried out by treating the sample, or using a washing step, deuterium exchange is the preferred approach.

Once generated, reactive oxygen species have a maximum distance they can travel from their source. Hence, the reaction of the reactive oxygen species with the optical component attached to the surface of the substrate will form a local region centred on the reporter reagent.

It is believed that the concentration of reactive oxygen species as a function of distance from a reporter molecule is governed by three factors: radial diffusion, the lifetime of the reactive oxygen species, and the rate of bimolecular reactions of the reactive oxygen species.

Bimolecular reactions of the reactive oxygen species may be productive, in that the reactive oxygen species reacts with a molecule of the optical component, changing the optical component from the first optical state to the second optical state.

Bimolecular reactions of the reactive oxygen species may also be non-productive, in that the reactive oxygen species reacts with a molecule that is not the optical component, resulting in quenching of the reactive oxygen species. An example of a non-productive reaction is the reaction of the reactive oxygen species with a reactive hydrogen atom, for example the hydrogen atom of an NH or an OH functional group. Reactive oxygen species, such as singlet oxygen are also known to form adducts with aromatic groups, such as histidine residues of proteins.

It has been found that reducing the effective concentration of reactive hydrogen atoms around the reporter reagent will reduce the ratio of non-productive to productive reactions of the reactive oxygen species. In this way, a greater number of optical component molecules in the region of the bound reporter reagent will be changed from the first optical state to the second optical state, resulting in a greater signal contrast. Additionally, the time taken to convert the optical component from the first optical state to the second optical state will be reduced.

Reducing the effective concentration of reactive hydrogen atoms around the reporter reagent will also result in the reactive oxygen species travelling further from the reporter reagent, resulting in a larger local region of optical component in the second optical state. A larger local region is easier to visualise using simple optical methods.

The present invention provides a way of reducing the effective concentration of reactive hydrogen atoms around the reporter reagent by using a deuterium-enriched analogue of the mixture, or deuterium-enriched analogues of the components of the device. It is believed that the kinetic isotope effect on replacing hydrogen with deuterium decreases the rate of reaction with the reactive oxygen species.

Additional approaches for reducing the effective concentration of reactive hydrogen atoms around the reporter reagent are suitable for working the invention, such as preparing components of the device using materials with fewer reactive hydrogens, for example an inert polymer in place of a layer formed of a polysaccharide or a protein.

Other approaches for decreasing the unproductive reactions of the reactive oxygen species may also be included in the method and device of the present invention.

The present invention therefore provides a deuterium-enriched environment in which the reactive oxygen species are generated. In this way, the reactive oxygen species will diffuse further from the reporter reagent than it would in a non-deuterium-enriched environment and therefore generate larger signals. In one embodiment, larger signals are generated by the reporter reagent. In another embodiment, the same size signals are generated using smaller reporter reagent particles. Additionally, signals of a specific size may be generated more quickly, or electromagnetic radiation of lower intensity can be used to stimulate the photosensitiser.

A benefit of generating larger signals is that they are easier to detect than smaller signals. For a standard optical microscope, the choice of lens (including the numerical aperture of the lens, and its magnification), coupled with the measurement wavelength, defines the resolving power and depth of field of the system. It is preferable to use the lowest magnification lens possible in order to measure the dark spots. Lower magnification lenses have a greater depth of field and wider field of view. This makes it easier to focus the lens on the surface, and also allows more surface area to be visualised without having to move the lens or substrate relative to each other. In turn, this reduces the complexity and cost of the instrument.

Although the sample and reporter may be mixed prior to being provided to the device, the incubation and binding are normally performed in a small volume without mixing. It is therefore advantageous that the reporter reagent comprise a smaller particle as smaller particles diffuse more rapidly to the substrate surface. Additionally, smaller particles are less sterically constrained and have greater rotational energy, enhancing the rate of binding when they do diffuse to the substrate surface. A greater rate of binding allows the assay to be carried out in a shorter timeframe, which is particularly beneficial for point-of-care applications. Additionally, a greater rate of binding, allows for a more sensitive assay.

The method of the present invention therefore facilitates the detection of the signals formed in step (iii) of the invention.

In a preferred embodiment, the optical component is a dye. Preferably, the optical component is selected from one of the following dyes and mixtures thereof:

(1)

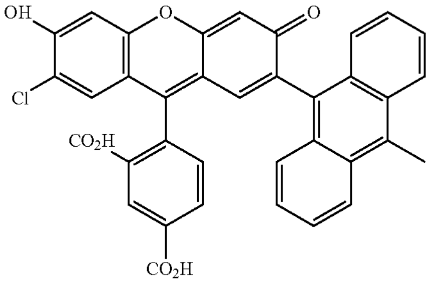

SOSG (2)

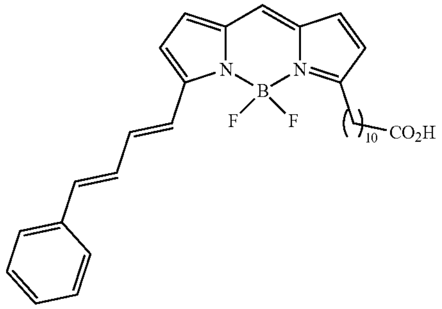

BODIPY$_{581/591}$ (3)

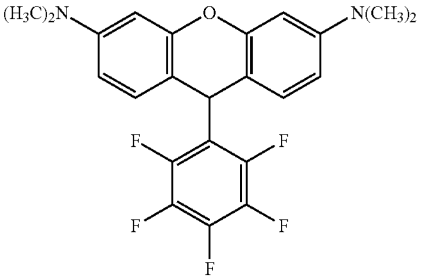

DHR123

-continued (4)

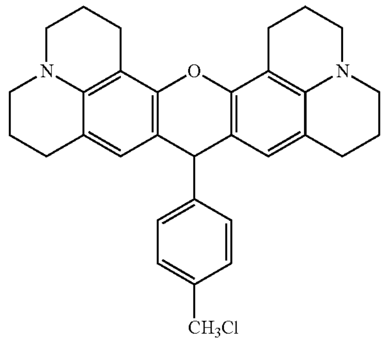

Mitotracker Red ($H_2$)

(5)

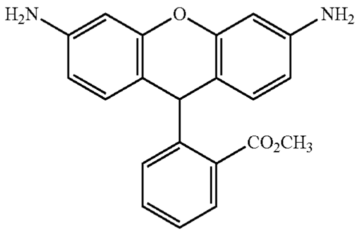

Redoxsensor Red CC-1

(6)

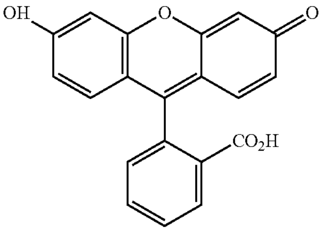

Fluorescein (7)

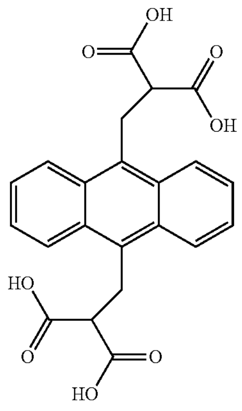

ABDA

-continued (8)

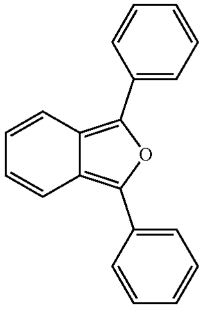

DPBF

Dyes (1)-(5) are known and are used as cellular probes to monitor reactive oxygen species formation in cells under oxidative stress. However, these dyes are not known for use in either a standard or a digital immunoassay. Dye (6) is a common fluorescent dye. Dyes (7) and (8) are known to react specifically with singlet oxygen, although they are not known for their use in immunoassays. There are a wide range of other fluorescent dyes that are commercially available and suitable for use in the present invention, including Alexafluor dyes, BODIPY dyes, rhodamine dyes, Texas red, Oregon green, Cascade yellow, Pacific blue etc. For further examples see The Molecular Probes Handbook, Thermo Fisher Scientific.

Dye singlet oxygen sensor green (SOSG) (1) reacts with singlet oxygen to convert it from a weakly fluorescent form to a highly fluorescent form. The singlet oxygen reacts with the anthracenyl group to form an endoperoxide. In a preferred embodiment, the optical component is SOSG.

Dye boron-dipyrromethene$_{581/591}$ (BODIPY$_{581/591}$) (2) reacts with reactive oxygen species such as singlet oxygen and the hydroxyl radical, leading to a hypsochromic shift in the fluorescence excitation/emission maxima.

Dyes (3)-(5) share the same core structure and react with general oxidising agents, including singlet oxygen, to convert them into a fluorescent form. These dyes can therefore be converted from a leuco state into a fluorescent state.

Dye (6) has been found to react with singlet oxygen to convert it from a fluorescent form into a non-fluorescent form. Using fluorescein, it has been surprisingly found that it is possible to completely eliminate the fluorescence in the vicinity of the photosensitiser to create a dark, non-fluorescent area in the fluorescent substrate. Dyes (7) and (8) fluoresce in the UV and react with singlet oxygen to generate an endoperoxide, giving a non-fluorescent product.

Preferably, the optical component when in one of the first and second optical states is fluorescent and the optical component when in the other of the first and second optical states is non-fluorescent. In one embodiment, the optical component when in the first optical state is non-fluorescent and the optical component when in the second optical state is fluorescent. More preferably however, the optical component when in the first optical state is fluorescent and the optical component when in the second optical state is non-fluorescent.

In another preferred embodiment, the optical component when in the first optical state fluoresces at one or more wavelengths and the optical component when in the second optical state fluoresces at one or more other wavelengths. In this embodiment, the optical component shifts its fluorescence excitation/emission maxima.

Preferably, the change from the first optical state to the second optical state is irreversible. This allows for subsequent scanning of the substrate to identify areas in which the change in optical state has taken place.

Step (iv) of the method of the present invention involves detecting the set of local regions having the second optical state on the substrate.

The optical component having the second optical state forms a set of local regions on the substrate. Advantageously, local regions having the second optical state can be counted as individual binding events. The present invention is thus suitable for performing a digital assay. However, if there are a large number of binding events such that the majority of the optical component is in the second optical state, the bulk change can be detected.

In a preferred embodiment, the set of local regions having the second optical state on the substrate are detected by counting local regions in the set of local regions having the second optical state on the substrate or by measuring the set of local regions having the second optical state on the substrate as a bulk property. More preferably, the set of local regions having the second optical state on the substrate are detected by counting local regions in the set of local regions having the second optical state on the substrate.

Local regions having the second optical state may need to be above a threshold value corresponding to a background signal, or corresponding to a temporary binding event, depending on the first and second optical states. For example, the sample may have some background autofluorescence but if this is not above the threshold value then it should not impact the signal due to the digital nature of the assay. Computer software can be used to detect the presence of the local regions, and distinguish local regions above the threshold value from those below the threshold value.

In addition, the surface of the substrate may be scanned to give a 2D image of the surface prior to irradiation of the photosensitiser and then scanned after irradiation, with the pre-illumination image being background-subtracted from the post-illumination image to reduce interference from artefacts, contaminants and any autofluorescence on the surface or in the sample itself. Therefore, in a preferred embodiment, the method of the present invention further comprises subtracting any component having the second optical state on the substrate detected prior to irradiating the device with electromagnetic radiation from the set of local regions having the second optical state on the substrate detected in step (iv). In this way, the background-subtracted image will only display changes to the optical properties of the substrate (e.g. changes in fluorescence intensity).

The set of local regions having the second optical state on the substrate are typically discrete areas on the substrate. However, some local regions may be excluded from detection owing to their morphology. Local regions corresponding to an individual binding event tend to be uniform and circular but some local regions may be irregular in shape, corresponding to artefacts. Further, some local regions may be larger than others where particles have clumped together. Therefore, in a preferred embodiment, only uniform, circular local regions having the second optical state on the substrate are detected.

Figure 7:
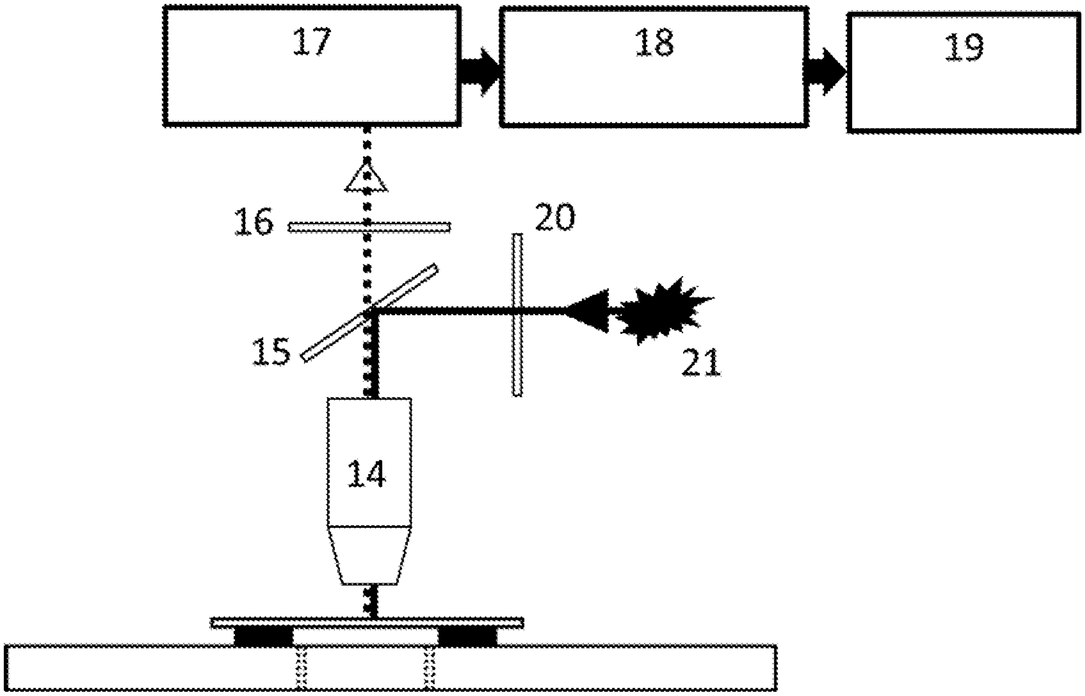
FIG. 7 shows an optical set-up for detection.

The set of local regions on the substrate can be detected using simple optical means. An optical set-up suitable for detection is shown in FIG. 7. The components of FIG. 7 are: objective lens 14; dichroic mirror 15; emission filter 16; photodetector/camera 17; microprocessor 18; data output 19; excitation filter 20; light source (LED/laser) 21. In a preferred embodiment, the set of local regions having the second optical state on the substrate is detected using optical microscopy. More preferably, the set of local regions having the second optical state on the substrate is detected using wide-field microscopy. Wide-field microscopy is the simplest form of microscopy, whereby the whole sample is illuminated and imaged at the same time, in comparison to more complex techniques such as confocal microscopy where only one single focal spot is illuminated and recorded at a time. The benefits of confocal microscopy are increased contrast by removal of out-of-focus haze and the ability to take a stack of images through the depth of the sample. Super-resolution microscopy techniques are also known, such as photo-activated localization microscopy (PALM or FPALM) and stochastic optical reconstruction microscopy (STORM). These methods have added complexity and cost over simple wide-field methods.

If using dyes (1) and (3)-(5), fluorescent local regions (or, if there are a large number of binding events, an increase in fluorescence) can be observed on the surface of the substrate where the optical component has been converted into the second optical state. In order to detect this fluorescence, the substrate can be illuminated at the excitation wavelength of the dye and the surface of the substrate scanned for light emission.

If using dye (2), either a decrease in fluorescence emission at 610 nm or an increase in fluorescence emission at 515 nm can be measured, or both wavelengths can be monitored.

If using dyes (6)-(8), dark local regions (or, if there are a large number of binding events, a dark image) can be observed on the surface of the substrate where the optical component has been converted into the second optical state. In order to detect these dark spots or image, a wide-field fluorescent microscope with a light source (for example, an LED) and a photodetector (for example a photomultiplier tube or a camera, such as a CCD) can be used, using excitation and emission filters suitable for the detection of each fluorophore (for example fluorescein can be detected with excitation at 490 nm and emission at 520 nm).

The photosensitiser is proximal to the substrate when the binding event has occurred. That is, the photosensitiser is sufficiently close to the surface of the substrate to interact with the optical component and convert it from the first optical state to the second optical state on irradiation of the device. The actual distance between the photosensitiser and the surface of the substrate will, however, depend on a number of variables, such as the size and nature of the photosensitiser, the size and nature of the binding component, the reporter reagent and the analyte, and the nature of the sample medium.

The binding component has a binding site which is capable of binding a reporter reagent proportionally to the concentration of the analyte in the sample. The proportionality is important for the functioning of the assay since the binding must be dependent on the concentration of the analyte for any meaningful measure of the concentration of the analyte to be determined. The binding may be directly proportional or indirectly proportional to the concentration of the analyte depending on the type of assay being performed. In the case of a non-competitive assay, e.g. an immunometric assay, the binding is directly proportional to the concentration of the analyte, but for a competitive assay, the binding is indirectly proportional to the concentration of the analyte.

One particular type of competitive assay is presented in which an antibody to the analyte is immobilised on the substrate, and a labelled analogue of the analyte is introduced into the sample. The analyte and labelled analogue of the analyte then "compete" for the antibody on the surface. In the absence of analyte, then the labelled analogue will bind at the maximum possible rate. However, in the presence of analyte, the antibody on the substrate becomes populated with analyte and the rate of binding of the analogue is diminished.

The binding component may be adapted to bind to the analyte, or a complex or derivative of the analyte, in which case the reporter reagent will bind to the binding component in the presence of the analyte, or the complex or derivative of the analyte. In this case, the binding component has a binding site which is capable of binding to the reporter reagent in the presence of the analyte or the complex or derivative of the analyte. The binding is, however, still proportional to the concentration of the analyte.

Alternatively, the binding component may itself be an analogue of the analyte and the reporter reagent binds directly to the binding component (it is an analogue because it is bound to the surface of the substrate either through covalent bonding or non-covalent interactions). In this case, the binding component will compete with the unbound analyte, or an unbound complex or derivative of the analyte, for the binding of the reporter reagent. Accordingly, the binding component will simply be capable of binding to the reporter reagent.

Determining the extent of binding of the reporter reagent to the binding component (either directly or mediated by the analyte/complex or derivative of the analyte) provides a measurement of the concentration of the analyte in the sample.

The assay also requires the presence of a reporter reagent. The reporter reagent of the present invention includes a photosensitiser. Upon absorption of electromagnetic radiation, the photosensitiser reacts with the pre-activator reagent to generate a reactive oxygen species. This reactive oxygen species goes on to interact with the optical component. It is this interaction which causes the optical component to change from the first optical state to the second optical state.

The photosensitiser may therefore be composed of any material which is capable of interacting with the electromagnetic radiation in this manner. Suitable photosensitisers are known from photodynamic therapy (PDT) as PDT reagents. PDT reagents are used in cancer therapy and dermatology to destroy cells upon illumination (Shafirstein et al., Cancers, 2017, 9, 12; Wan and Lin, Clinical, Cosmetic and Investigational Dermatology, 2014, 7, 145).

Upon irradiation with electromagnetic radiation, PDT reagents are promoted to an excited triplet state. This excited triplet state can interact directly with cellular components, in what is called a Type I process or can interact with oxygen in what is called a Type II process. Both Type I and Type II processes can lead to the formation of reactive oxygen species. In the Type II process, the predominant product is singlet oxygen, through an intersystem crossing mechanism.

Singlet oxygen is an excited state of oxygen that is highly reactive. It can undergo a number of reactions before decaying, including Diels-Alder type reactions and ene reactions. It also undergoes general oxidation reactions with sulfur and nitrogen containing compounds. The indiscriminate reactivity of singlet oxygen is one of the reasons why it is used in photodynamic therapy.

A wide range of photosensitiser compounds are known, including porphyrins, chlorins (for example pyropheophorbide-a), phthalocyanines and other polyaromatic species (see, for example, Antibody-Directed Phototherapy, Pye et al., Antibodies, 2013, 2, 270).

In one embodiment, the photosensitiser is selected from porphyrins, chlorins, phthalocyanines and other polyaromatic species. The photosensitiser may be directly bound to the reporter reagent via a covalent bond. Alternatively, a large number of photosensitisers may be encapsulated within a particle, e.g. a polystyrene latex particle, and an antibody may be bound to the particle. A benefit of using particles is that a greater number of photosensitisers can be coupled to the reporter reagent. Additionally, many photosensitisers are polyaromatic species that have poor solubility in aqueous media. Encapsulating them in a colloidal particle avoids the issue of solubility. Polystyrene latex particles are available in a wide range of sizes, from diameters of 10 nanometres and upwards.

The nature of the binding component and the reporter reagent will depend on the nature of the analyte, but they are preferably antibodies. The present invention has particular applicability in immunoassays. In a particularly preferred embodiment, the binding component is an antibody raised to the analyte or the complex or derivative of the analyte, and the reporter reagent comprises an antibody raised to the analyte or the complex or derivative of the analyte. In principle, a single molecule could be used for each reagent, but in practice, the binding component and the reporter reagent are a population of molecules. The term "antibody" preferably includes within its scope a Fab fragment, a single-chain variable fragment (scFv), and a recombinant binding fragment.

As alternatives to antibody-antigen reactions, the binding component, the reporter reagent and the analyte may be a first and second nucleic acid where the first and second nucleic acids are complementary, or a reagent containing avidin or derivatives thereof and an analyte containing biotin or derivatives thereof, or vice versa. The binding component and the reporter reagent may also be aptamers. The system is also not limited to biological assays and may be applied, for example, to the detection of heavy metals in water. The system also need not be limited to liquids and any fluid system may be used, e.g. the detection of enzymes, cells and viruses etc. in the air.

The maximum observable signal is the maximum signal that can be achieved when monitoring the photosensitiser binding to a surface. The binding of particles to the substrate is governed by the diffusion rate of the analyte and reporter reagent which is, in turn, governed largely by the hydrodynamic radius of these components and the viscosity/temperature of the sample.

The device used in the present invention may further comprise controls which compensate for natural variability in the components of the measuring system, variability in the samples that are measured, and variability in the environmental conditions during the measurement. This can be achieved by exposing the sample to reagents on the surface of the substrate. The different reagents are typically located at different areas of the surface of the substrate, these areas being coated in different reagents. These controls are defined as "negative" and "positive" controls, in the sense that the negative control should approximate the expected signal in the absence of analyte, and the positive control should approximate the expected signal when analyte has saturated the system.

To achieve detection with these controls, the device of the present invention preferably comprises a binding component, a negative control reagent and a positive control reagent, each of which is attached to the surface of the substrate as described above.

The binding component is as described above.

The negative control reagent has a lower affinity for the reporter reagent under the conditions of the assay than the binding component. Accordingly, the negative control reagent provides the negative control. It is important that the affinity is considered under the conditions of the assay. The reason is that in the case of a non-competitive assay, the affinity of the binding component for the reporter reagent is mediated by the presence of the analyte, or the complex or derivative of the analyte. Thus, in the absence of the analyte, or the complex or derivative of the analyte, neither the binding component nor negative control reagent has any affinity for the reporter reagent. However, in the presence of the analyte, or the complex or derivative of the analyte, the negative control reagent has a lower affinity for the reporter reagent than the binding component.

In addition, in the embodiments where the binding component binds to the analyte, or the complex or derivative of the analyte, the negative control reagent preferably has a lower affinity for the analyte or, if used, the complex or derivative of the analyte than the binding component. The negative control reagent is preferably a protein and more preferably an antibody. The negative control reagent typically has similar chemical and physical properties to the binding component, but provides little or no affinity for the reporter reagent under the conditions of the assay. In a particularly preferred embodiment, the negative control reagent has essentially no affinity for the reporter reagent under the conditions of the assay. Preferably, the negative control reagent provides essentially no affinity for the analyte or the complex or derivative of the analyte. That is, the binding of the reporter reagent, or, where applicable, the analyte or the complex or derivative of the analyte, to the negative control reagent is non-specific. In this manner, the negative control reagent can compensate for non-specific binding of the reporter reagent to the binding component. Additionally, if the binding of reporter to the negative control is above a threshold, this can trigger an error code and the measurement can be aborted.

The positive control reagent binds to the reporter reagent and has an affinity for the reporter reagent which is less influenced by the concentration in the sample of the analyte or, if used, the complex or derivative of the analyte than the binding component and hence provides the positive control. Preferably, the positive control reagent has an affinity for the reporter reagent which is essentially independent of the concentration of the analyte or the complex or derivative of the analyte. More preferably, the positive control reagent has a higher affinity for the reporter reagent under the conditions of the assay than the binding component. In this manner, the positive control reagent measures the maximum expected signal in the system.

In order to increase the dynamic range of an assay performed in accordance with the present invention, whilst also improving precision, it is preferred to have the binding component in a plurality of locations on the substrate. These locations may be tuned to different sensitivities, by varying the concentration of the binding component at each location. Each location may also have its own negative control and positive control reagents to act as controls for the different dynamic ranges. This is particularly applicable to competitive assays which are particularly sensitive to the concentration of each of the individual components which make up the system.

Although the description above allows the assay to reach an equilibrium before activating the photosensitiser, it is also possible that the kinetics of the binding events could be monitored by illuminating the photosensitiser for discrete periods of time over a time-course and monitoring the binding events as they take place over the course of the reaction, prior to equilibrium being attained.

The analyte may be a macromolecule or a small molecule. The macromolecule is typically a protein, such as a protein-based hormone, and may also be part of a larger particle, such as a virus, a bacterium, a cell (e.g. a red blood cell) or a prion. The small molecule may be a drug.

The term “small molecule” used herein is a term of the art and is used to distinguish the molecule from macromolecules such as proteins and nucleic acids. A small molecule is often referred to in the field of immunoassays as a “hapten”, being a small molecule which, when attached to a large carrier molecule such as a protein, can elicit an immune response and includes molecules such as hormones and synthetic drugs. A small molecule of this type will typically have a molecular weight of 2,000 or less, often 1,000 or less and even 500 or less. The binding component may be adapted to bind to the analyte itself, although the analyte can undergo a chemical reaction or initial complexing event before binding to the binding component. For example, the analyte might be protonated/deprotonated in the pH of the assay conditions. Thus, the analyte which is bound to the binding component may be the analyte itself or a derivative of the analyte; both are included within the scope of the present invention.

In a preferred embodiment, the present invention may be used to detect the presence of multiple analytes in the same sample at the same time. Different binding components can be used in different locations on the substrate for the measurement of each analyte. Sandwich and competitive assays may be run in parallel and the assays may use the same negative and positive controls as described above, or there may be separate controls for each analyte being measured.

The sample which is suspected of containing the analyte of interest will generally be a fluid sample, e.g. a liquid sample, and usually a biological sample, such as a bodily fluid, e.g. blood, plasma, saliva, serum, intraocular fluid, cerebrospinal fluid or urine. The sample may contain suspended particles and may even be whole blood. In a preferred embodiment, the sample is unprocessed and more preferably, is an unprocessed fluid. By unprocessed is meant that the sample/fluid is not pre-treated by filtration, dilution or any other pre-processing step prior to being mixed with the reporter reagent and other assay components. However, it is within the scope of the invention to process the sample in order to provide a deuterium-enriched mixture, for example by dilution with a deuterium-enriched fluid, or incubation with a deuterium-enriched fluid. An advantage of the present invention is that the assay may be performed on a sample which contains suspended particles without unduly influencing the results of the assay. Preferably, the sample is unprocessed except for deuterium-enrichment.

In a preferred embodiment, the sample is whole blood. It is surprising that the components of whole blood do not interfere with the method of detection of the present invention. It is usual to remove the red blood cells from blood to measure fluorescence in the plasma or serum component of the blood due to unpredictable scattering of light by the cellular components, which varies from sample to sample. However, in the present invention, because the fluorescence would be measured on the substrate, and because individual binding events can be measured, the measurement can take place in whole blood.

The sample will typically be in the order of microlitres (e.g. 1-100 μL, preferably 1-10 μL). In order to hold a fluid sample, the substrate is preferably located in a sample chamber having one or more side walls, an upper surface and a lower surface. Accordingly, the device used in the present invention preferably further comprises a chamber for holding the sample containing the analyte in contact with the substrate.

A potential additional source of background interference is the settling of suspended particles on to the surface of the substrate, including reporter reagent and cellular components of the sample. This source of interference may be reduced by positioning the substrate above the bulk solution, e.g. on the upper surface of the reaction chamber. Thus, if any settling occurs, it will not interfere with the substrate. Preferably the substrate forms the upper surface as shown in the figures. Preferably, the substrate is substantially planar. More preferably, the substrate is planar. By “substantially planar” it is meant that the substrate deviates from planarity only up to a point where it remains functional in the invention, for example, such that the whole of the substrate remains within a single focal range or field of view when being imaged. Clearly, the optical and binding components will be on the interior surfaces of the chamber to allow contact with the sample. This and other modifications are included in the scope of the present invention.

The sample may simply be retained by surface tension forces, for example, inside a capillary channel.

The reporter reagent and optionally one or more additional reagents are preferably stored in a chamber incorporated into the device used in the present invention.

The present invention is especially useful in point-of-care (POC) testing. POC testing is defined as diagnostic testing at or near the point of care, i.e. bedside testing. POC testing enables convenient and rapid testing, allowing improved decision making and triage whilst better allocating hospital resources such as accident and emergency care and hospital beds. This contrasts with traditional testing in which samples were taken at the point of care and then sent to the laboratory for testing. With such testing, it often takes hours or days to get the results, during which time care must continue without the desired information. POC testing often uses test kits in combination with portable instruments.

The present invention is especially useful for monitoring the concentration or presence/absence of analytes that are normally in very low abundance. Potential applications including measuring biomarkers in cardiac disease (e.g. high-sensitivity troponin), infectious disease (e.g. Hepatitis C core antigen), aging/dementia (e.g. Alzheimer’s disease markers Amyloid Beta and phosphorylated Tau, Neurofilament Light Chain), cytokines and oncology (e.g. circulating tumour markers).

The present invention also provides a device for detecting an analyte in a sample, the device comprising: a substrate having an optical component and a binding component, where the optical component and the binding component are attached to a surface of the substrate, the photosensitiser being capable of generating reactive oxygen species from the pre-activator reagent upon absorption of electromagnetic radiation, and the optical component being capable of changing from a first optical state to a second optical state on reaction with the reactive oxygen species, and wherein the substrate has a deuterium-enriched layer on the surface thereof.

The features of the device are as described above for the device used in the present invention.

In a preferred embodiment, the device further comprises a chamber for holding a mixture of the sample and the reporter reagent.

The device of the present invention may include a radiation source which is adapted to generate electromagnetic radiation and a detector which is adapted to detect the optical component in the second optical state thereby allowing a precise determination of the position of the photosensitiser with respect to the substrate.

The device of the present invention may take the form of a cartridge to be used with a separate reader. The reader may incorporate the radiation source and the detector. The reader is preferably a portable reader. Preferably, the device comprises a cartridge, wherein the substrate is within the cartridge, and wherein the device further comprises a detector for detecting the set of local regions having the second optical state on the substrate. The present invention may also provide the cartridge comprising the substrate and the optical and binding components as defined herein. The cartridge is preferably a disposable cartridge.

The present invention also provides a system for detecting an analyte in a sample, comprising: the device of the present invention; and the reporter reagent and pre-activator reagent for forming a mixture comprising the sample, the reporter reagent being capable of generating reactive oxygen species from the pre-activator reagent upon absorption of electromagnetic radiation, and the optical component being capable of changing from a first optical state to a second optical state on reaction with the reactive oxygen species, and wherein, prior to irradiating, the substrate may be contacted with a deuterium-enriched fluid.

Preferably, the photosensitiser of the reporter reagent is capable of absorbing electromagnetic radiation to interact with a pre-activator reagent present in the mixture to generate a reactive oxygen species, and the reactive oxygen species is capable of reacting with the optical component to change the optical component from the first optical state to the second optical state.

In a preferred embodiment, the system of the present invention consists essentially of the above-described features. By "essentially" is meant that no other features are required to perform the assay.

The present invention will now be described with reference to the following examples which are not intended to be limiting.

EXAMPLES

Materials

Biotinylated bovine serum albumin (BSA) and fluorescein-labelled streptavidin were prepared according to techniques known in the art. These materials are also commercially available. Anti-TSH antibody 5407 (Medix Biochemica) was conjugated to aldehyde-coated alphascreen donor beads (Perkin Elmer catalogue number 6762013) using protocols available from Perkin Elmer. These protocols involved incubating beads and antibody overnight in the presence of cyanoborohydride, then adding (carboxymethoxy)amine to quench the reaction. Excess antibody was removed by centrifugation and washing steps.

Example 1

Silanised Glass Cover Slips

Fresh piranha solution was prepared by adding 50 mL of 30% hydrogen peroxide solution to 150 mL of concentrated sulfuric acid. Then 22 mm by 22 mm cover slips 23 (Brand, catalogue number 4700 55) were loaded onto a stainless-steel rack, then immersed in the piranha solution for 30 minutes, followed by rinsing three times in deionised water, then three times in isopropanol. The cover slips were then immersed in a solution of fresh 5% dichloro(methyl)phenyl silane (Merck, catalogue number 440116) in isopropanol for 2 minutes. They were then washed three times in isopropanol and dried in an oven at 100° C. for 1 hour.

Example 2

Preparation of Substrate Surface

Figure 8:
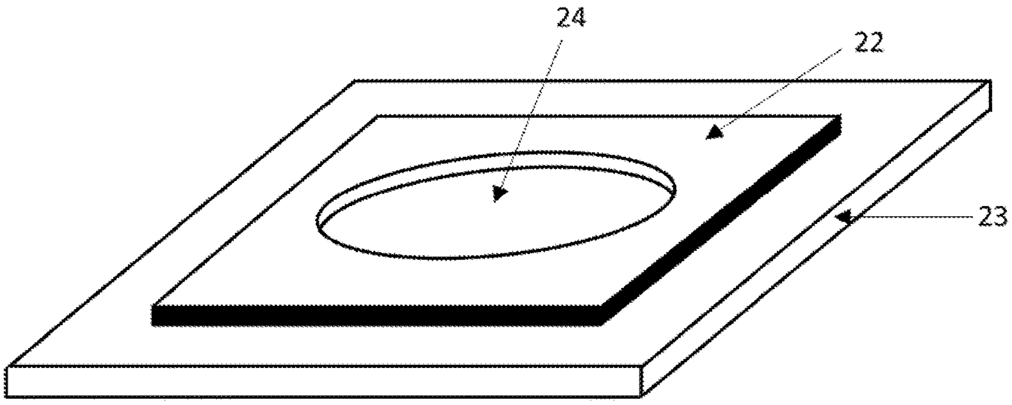
FIG. 8 shows a substrate and well created for the present invention.

A 1 cm by 1 cm square piece of 200 μm thickness pressure-sensitive adhesive (PSA) 22 with a 6 mm diameter hole cut out, was attached to the silanised cover slip 23 described in Example 1, to create a shallow well 24, as shown in FIG. 8. Then 50 μL of biotinylated BSA (10 μg/mL in 40 mM phosphate buffer) was then placed into the well and incubated for two hours, before being washed off with wash buffer (40 mM phosphate, 2% sucrose, 0.9% NaCl, 0.03% BSA). 30 μL of fluorescein-labelled streptavidin (10 μg/mL in 40 mM phosphate, 2% sucrose, 0.9% NaCl, 0.03% BSA) was then added to the well and incubated for 60 minutes, before being washed three times with wash buffer. 30 μL of biotinylated 5409 anti-TSH antibody (20 μg/mL in 40 mM phosphate buffer, 2% sucrose, 0.9% NaCl, 0.03% BSA) was then incubated for 30 minutes, then washed three times with wash buffer and dried in air at room temperature.

Figure 9:
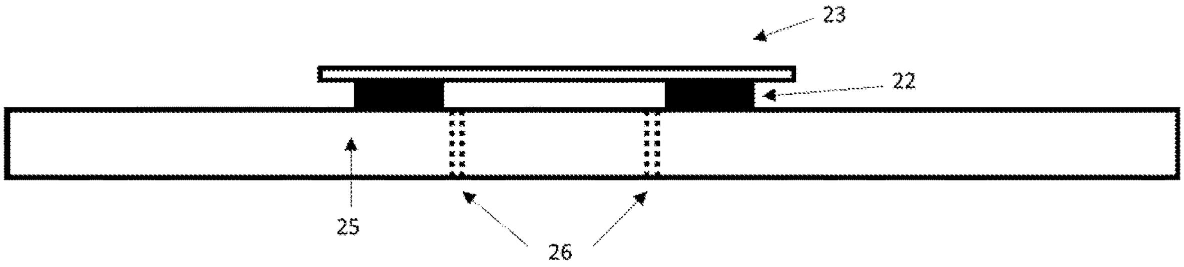
FIG. 9 shows a sample chamber created using the substrate and well of FIG. 8.

The release liner was then removed from the PSA, the substrate was inverted and attached to a piece of acrylic sheet 25 with two small holes 26 drilled through to create a reaction chamber, as shown in profile in FIG. 9.

Example 3

Binding of Photosensitiser Beads to Surface 200 nm Alphascreen donor beads coated with anti-TSH antibody (0.5% solids) were diluted 1 in 500 into a solution of TSH (100 pg/mL) in phosphate buffer with 0.5% BSA and 0.05% Tween-20. 8 μL of this mixture was added by pipette into the reaction chamber via one of the holes and incubated for 30 minutes in the dark. After 30 minutes, the chamber was flushed three times with phosphate buffer.

Example 4

Generation of Bleached Areas in a Non-Deuterated Environment

Figure 10:
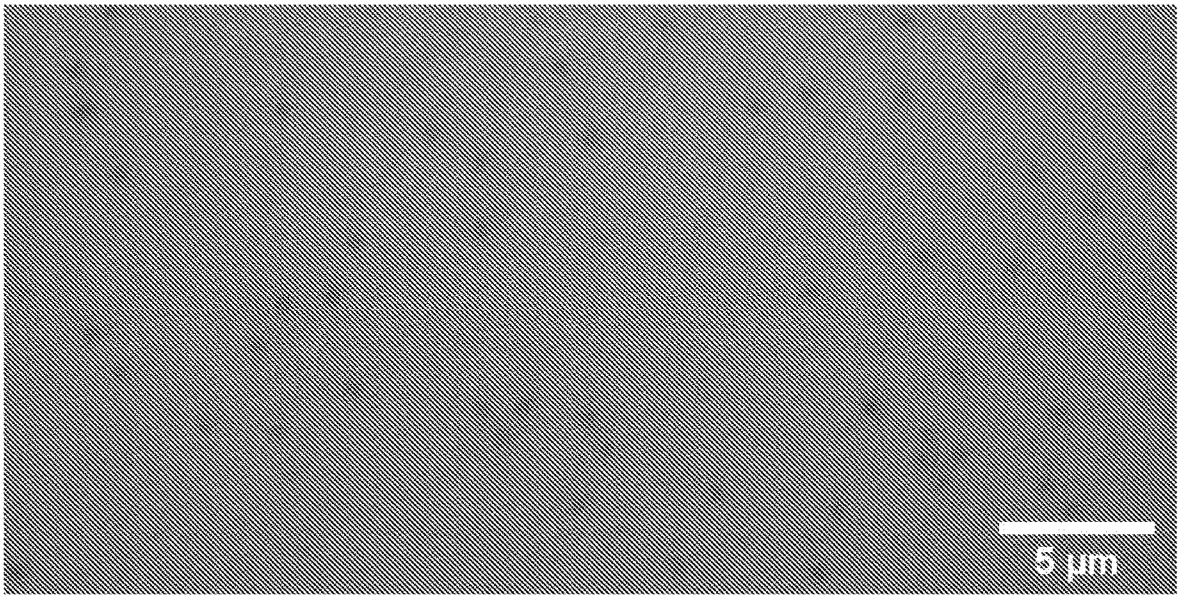
FIG. 10 shows the detection results from Example 4.

The reaction chamber from Example 3 was illuminated for 1 minute using a narrow cone angle 680 nm LED with a total light output of 15 mW focused onto the surface of the glass cover slip. The surface was then imaged on a Euromex iScope epifluorescent microscope with a mercury discharge bulb and a GXCam HiChrome MET camera (1080×1920 pixels) using a fluorescein excitation/emission filter set attached to a 60× air lens with a numerical aperture of 0.85. FIG. 7 shows the optical set-up. A representative image of part of the surface is shown in FIG. 10. Each of the dark spots represents where a binding event has taken place on the surface. The approximate diameter of the spots in this image is 0.4 μm.

Example 5

Generation of Bleached Areas in a Deuterated Environment

Figure 11:
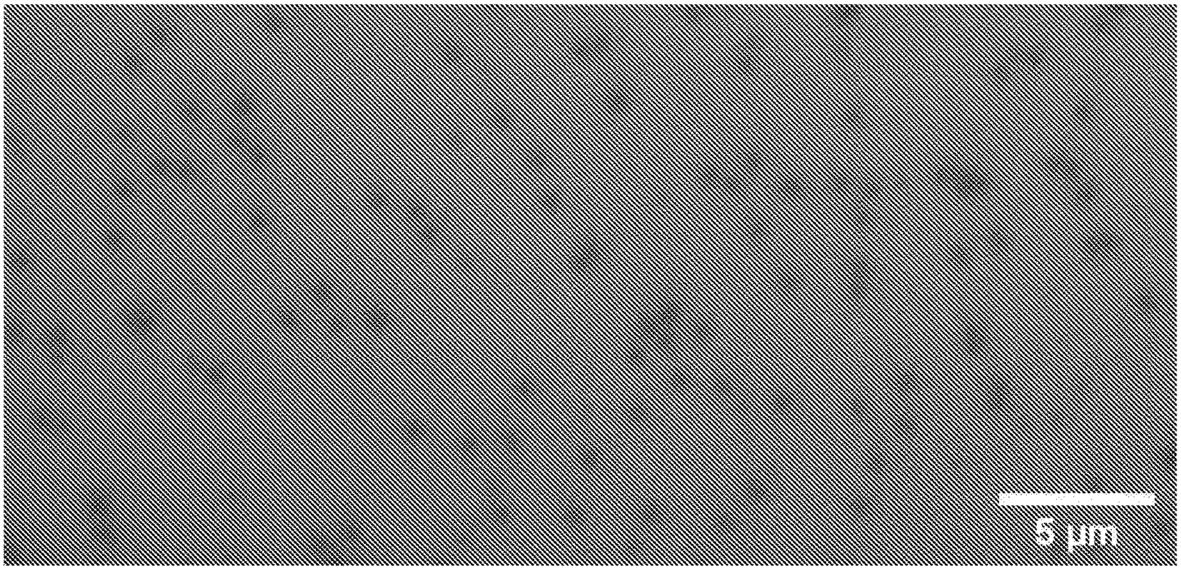
FIG. 11 shows the detection results from Example 5.

A second reaction chamber was prepared as in Example 3, except that the three final washes were carried out in deuterated phosphate buffer, prepared by dissolution of a phosphate buffer tablet into deuterium oxide. The surface was imaged in the same fashion as in Example 4. A representative image of the surface is shown in FIG. 11. In this instance, the dark spots have approximately twice the diameter, averaging 0.8 μm.

What is claimed is:

1. A method for detecting an analyte in a sample, the method comprising the steps of:

(i) providing a mixture comprising a sample, a reporter reagent, and a pre-activator reagent to a device, the device comprising a substrate having an optical component and a binding component, where the optical component and the binding component are attached to a surface of the substrate, the reporter reagent being capable of generating reactive oxygen species from the pre-activator reagent upon absorption of electromagnetic radiation, and the optical component being capable of changing from a first optical state to a second optical state on reaction with the reactive oxygen species;

(ii) allowing a portion of the reporter reagent to bind to the surface of the substrate in proportion to the concentration of the analyte, by means of the binding component;

(iii) irradiating the device with electromagnetic radiation for absorption by the reporter reagent, thereby forming a set of local regions of the optical component having the second optical state on the substrate, wherein, prior to irradiating, the substrate is provided with a deuterium-enriched layer on the surface thereof; and (iv) detecting the set of local regions having the second optical state on the substrate.

2. The method as claimed in claim 1, wherein the deuterium-enriched layer comprises a deuterium-enriched polymer.

3. The method as claimed in claim 2, wherein the deuterium-enriched polymer comprises a deuterium-enriched protein layer or a deuterium-enriched polysaccharide layer.

4. The method as claimed in claim 1, wherein the reactive oxygen species is singlet oxygen.

5. The method as claimed in claim 1, wherein the set of local regions having the second optical state on the substrate is detected using optical microscopy.

6. The method as claimed in claim 1, wherein the optical component in the first optical state absorbs light at one or more first wavelengths and in the second optical state absorbs light at one or more second wavelengths, where the first and second wavelengths are different.

7. The method as claimed in claim 1, wherein the optical component in the first optical state is fluorescent and in the second optical state is non-fluorescent or the optical component in the first optical state is non-fluorescent and in the second optical state is fluorescent.

8. The method as claimed in claim 1, wherein the change from the first optical state to the second optical state is irreversible.

9. The method as claimed in claim 1, wherein steps (i) and (ii) take place in the absence of wash steps.

10. The method as claimed in claim 1, wherein the device is irradiated with electromagnetic radiation for more than 1 second.

11. A device for detecting an analyte in a sample, the device comprising: a substrate having an optical component and a binding component, where the optical component and the binding component are attached to a surface of the substrate, the binding component configured to bind a reporter reagent in proportion to the concentration of an analyte in a sample, the reporter reagent comprising a photosensitiser configured to generate reactive oxygen species from a pre-activator reagent upon absorption of electromagnetic radiation, wherein a mixture provided to the device comprises the sample, the reporter reagent and the pre-activator reagent and the optical component configured to change from a first optical state to a second optical state on reaction with the reactive oxygen species, and wherein the substrate has a deuterium-enriched layer on the surface thereof.

12. The device as claimed in claim 11, comprising a cartridge, wherein the substrate is within the cartridge, and wherein the device further comprises a detector configured to detect a set of local regions having the second optical state on the substrate.

13. A system for detecting an analyte in a sample, comprising:

the device as claimed in claim 11; and the reporter reagent and the pre-activator reagent configured to form a mixture comprising the sample.

14. A method for detecting an analyte in a sample, the method comprising the steps of:

(i) providing a mixture comprising a sample, a reporter reagent, and a pre-activator reagent to a device, the device comprising a substrate having an optical component and a binding component, where the optical component and the binding component are attached to a surface of the substrate, the reporter reagent being capable of generating reactive oxygen species from the pre-activator reagent upon absorption of electromagnetic radiation, and the optical component being capable of changing from a first optical state to a second optical state on reaction with the reactive oxygen species;

(ii) allowing a portion of the reporter reagent to bind to the surface of the substrate in proportion to the concentration of the analyte, by means of the binding component;

(iii) irradiating the device with electromagnetic radiation for absorption by the reporter reagent, thereby forming a set of local regions of the optical component having the second optical state on the substrate, wherein, prior to irradiating, the substrate is contacted with a deuterium-enriched fluid, such that a deuterium-enriched layer is configured to be formed on the surface of the substrate; and (iv) detecting the set of local regions having the second optical state on the substrate.

15. The method as claimed in claim 14, wherein the substrate is contacted with a deuterium-enriched fluid, and wherein the contact with the deuterium enriched fluid is by diluting the sample prior to allowing the portion of the reporter reagent to bind, or washing the substrate with a deuterium-enriched fluid after allowing the portion of the reporter reagent to bind.

16. The method as claimed in claim 15, wherein the deuterium-enriched fluid comprises deuterium oxide.

17. The method as claimed in claim 14, wherein the reactive oxygen species is singlet oxygen.

18. The method as claimed in claim 14, wherein the set of local regions having the second optical state on the substrate is detected using optical microscopy.

19. The method as claimed in claim 14, wherein the optical component in the first optical state absorbs light at one or more first wavelengths and in the second optical state absorbs light at one or more second wavelengths, where the first and second wavelengths are different.

20. The method as claimed in claim 14, wherein the optical component in the first optical state is fluorescent and in the second optical state is non-fluorescent or the optical component in the first optical state is non-fluorescent and in the second optical state is fluorescent.

21. The method as claimed in claim 14, wherein the change from the first optical state to the second optical state is irreversible.

22. The method as claimed in claim 14, wherein steps (i) and (ii) take place in the absence of wash steps.

23. The method as claimed in claim 14, wherein the sample is unprocessed except for deuterium-enrichment.

24. The method as claimed in claim 14, wherein the device is irradiated with electromagnetic radiation for more than 1 second.

* * * * *